Figure 1:
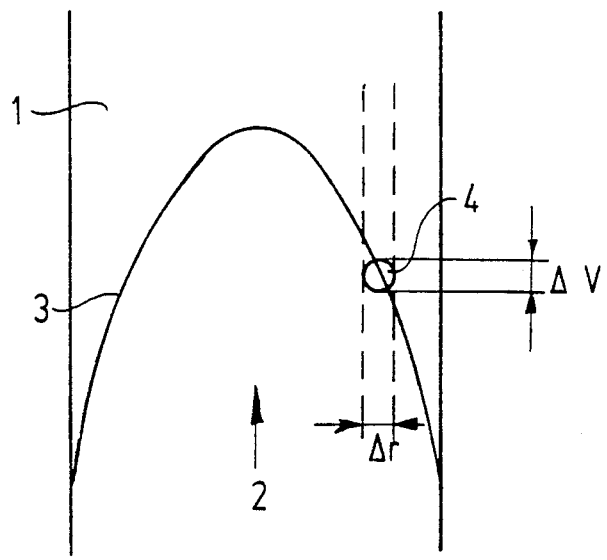
Figure 2:
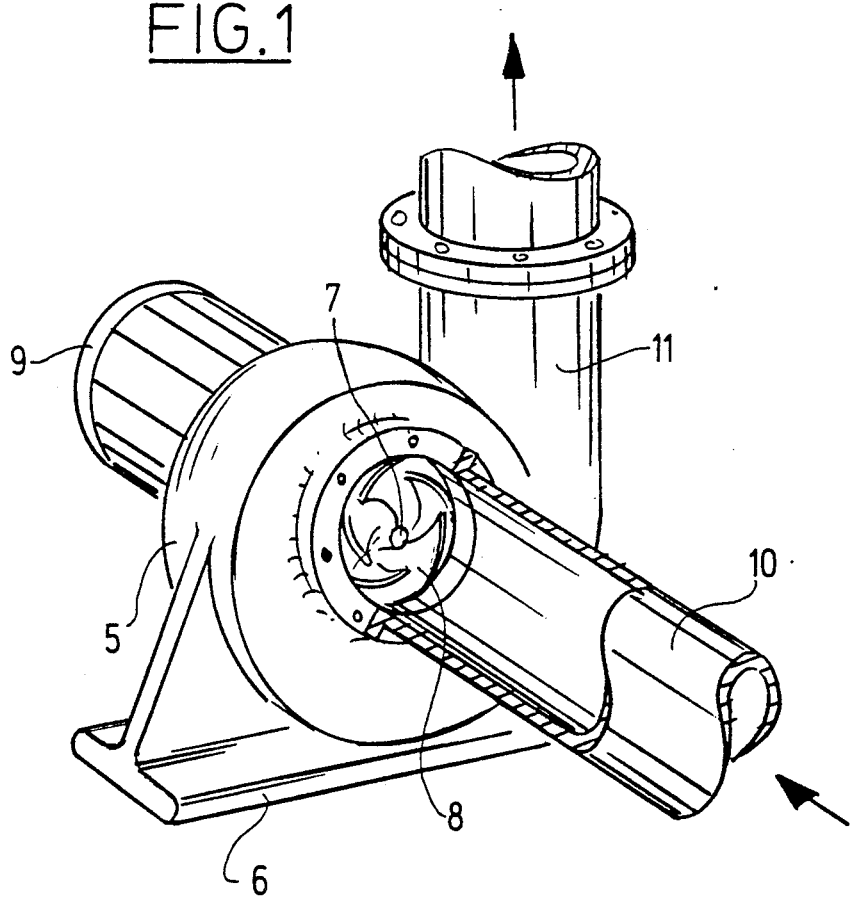

United States Patent [19]

Boersma

[11] Patent Number: 5,110,483
[45] Date of Patent: May 5, 1992

[54] SEPARATION OF PARTICLES ADSORBED ON CARRIER MATERIAL

[75] Inventor: Rintje Boersma, Bemmel, Netherlands

[73] Assignee: Smit Transformatoren B.V., Nijmegen, Netherlands

[21] Appl. No.: 628,643

[22] Filed: Dec. 12, 1990

[30] Foreign Application Priority Data

Jan. 2, 1990 [NL] Netherlands ............... 9000004

[51] Int. Cl.$^5$ .............................. B01D 21/26
[52] U.S. Cl. ..................... 210/787; 210/767; 210/512.1; 209/211; 415/120; 415/71
[58] Field of Search ............ 210/767, 781, 512.1, 210/787; 209/144, 211, 3, 13; 55/459.1, 52; 415/120, 71

[56] References Cited

U.S. PATENT DOCUMENTS

| | | | |
|---|---|---|---|
| 3,926,787 | 12/1975 | Gay | 209/3 |
| 4,217,207 | 8/1980 | Liller | 209/13 |
| 4,531,892 | 7/1985 | Nasman et al. | 415/71 |

FOREIGN PATENT DOCUMENTS

59-010317 4/1984 Japan .
59-154148 12/1984 Japan .

OTHER PUBLICATIONS

"Magnetic separation in water pollution control", IEEE Transactions on Magnetics vol. 11 No. 5 September 1975.

*Primary Examiner*—Robert A. Dawson
*Assistant Examiner*—David Reifsnyder
*Attorney, Agent, or Firm*—Wells, St. John & Roberts

[57] ABSTRACT

A method is described according to which composite particles made up of carrier magnetite particles with calcium carbonate and calcium phosphate flakes adhered thereto and present in a fluid suspension are separated into particles and flakes. To accomplish the method, the suspension is first introduced into the intake of a centrifugal pump. Vanes within the pump are then rotated to produce turbulence in the pump housing and a velocity gradient within the tangential discharge. The composite particles within the liquid are subjected to the velocity gradient and to shearing forces which cause an effective separation of the composite particles. The velocity gradient is such that shearing separation of the composite particles results in separated elements sized with the magnetite particles at least as large as the separated flakes of calcium carbonate and calcium phosphate.

7 Claims, 1 Drawing Sheet

SEPARATION OF PARTICLES ADSORBED ON CARRIER MATERIAL

TECHNICAL FIELD

The present invention relates to a method for separating composite particles comprised of a carrier material such as magnetite carrier particles and flakes of calcium carbonate and calcium phosphate absorbed thereto, and carried in a fluid such as water. The method relates more specifically to separation of the composite particles into individual magnetite carrier particles, calcium carbonate and phosphate flakes within the water.

BACKGROUND OF THE INVENTION

Separation of composite particles made up of magnetite carrier particles and adsorbed flakes of calcium phosphate and calcium carbonate is known from the article "Magnetic separation in water pollution control", IEEE Transactions on Magnetics, vol. 11, No. 5, September 1975.

According to this known method an ultrasonic field is applied to the fluid, and the separation of composite particles into magnetite particles and the flakes takes place slowly, so the separation process takes excessive time.

Further, the achieved separation is not complete. Unseparated composite particles and flakes remain.

The aim of the present invention is to provide a method for separating such composite particles, in which the separation process can take place in a shorter duration of time, and in which a more complete separation is achieved. This aim is reached in that the particles together with the flakes adhered thereto are subjected to a substantial velocity gradient. By the velocity gradient the particles are subjected to shearing forces, which cause an effective separation of the composite particles into elements.

BRIEF DESCRIPTION OF THE DRAWINGS

The present invention will be elucidated with the help of the accompanying drawings, in which:

FIG. 1 is a diagram for explaining the theoretical basis of the present invention; and FIG. 2 is a schematic view of an embodiment of an apparatus for application of the method according to the present invention.

DETAILED DESCRIPTION OF THE PREFERRED EMBODIMENT

In FIG. 1 a channel 1 has been shown, in which a laminary liquid current is present, depicted with an arrow 2. In the preferred process, the liquid is made up at least in part by water and composite particles 4. The composite particles are made up of magnetite carrier particles with calcium carbonate and calcium phosphate flakes absorbed thereon. The line indicated at 3 shows the velocity profile of the liquid current 2.

As an example, a composite particle 4 with size r has been drawn in the current 2. The particle experiences a velocity gradient $\Delta v$ in the position indicated. The composite particle is subjected to a shearing force, which is proportional with $G=dv/dr$. As a consequence of this force the composite particle will separate into at least two elements.

More specifically it appears from the literature that, when a certain value of G is present, the size of the flakes is limited to a value being dependent on said value of G, as greater particles will be pulled into elements by the shearing forces.

By setting the value of G, the maximum flake size capable of existing in the current can be controlled. The present invention uses this result by setting the value of G such, that the maximum flake size existing in the current is equal to the size of the magnetite carrier particles. At this value, the calcium phosphate and calcium carbonate flakes adhered to the magnetite particles are released from the magnetite particles.

More particularly, what is aimed for is a method, in which a shearing force can be generated, so the maximum remaining composite particle size existing in the current is equal to the particle size of the magnetite carrier particles.

Applicant has tested various apparatus to determine which would lead to the highest possible rate of separation according to the principals set out above. It has appeared that, surprisingly, a centrifugal pump will produce the best results in the separation of particles of magnetite from the flakes of calcium phosphate and calcium carbonate adhered thereto,.

Such a pump has been depicted in FIG. 2. This pump includes a housing 5, located on a base 6. A shift 7 has been provided in the housing 5, onto which a vane 8 has been provided. The shaft 7 is driven by an electric motor 9. A supply tube 10 has been provided concentric with the shaft 7. A tangential drain pipe 11 has been connected to the pump housing 5.

By rotating the vane 8 such a turbulence develops in the border area of the housing 5 that substantial velocity gradients develop within the tangential drain pipe 11 as shown diagrammatically in FIG. 1. As a consequence thereof a good separation between the particles and the flakes is achieved. Water, with a suspension of calcium phosphate-magnetite composite particles is fed to the pump, and it appears that in the effluent the greater part of the particles have been separated into elements.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A method of separating composite particles made up of carrier particles and flakes adsorbed thereon into individual elements including separate carrier particles and flakes within a liquid suspension, comprising the steps of:

introducing the liquid and composite particle suspension into an intake of a centrifugal pump having a rotatable vane within a housing and a tangential discharge leading outwardly of the housing;

rotating the vane to create a turbulence within the housing;

producing a velocity gradient within the tangential discharge; and exposing the composite particles within suspension to the velocity gradient within the tangential discharge to separate the composite particles into individual carrier particles and flakes within the liquid.

2. A method of separating composite particles as defined by claim 1 wherein the step of producing the velocity gradient includes producing a shearing force in the liquid and wherein the step of exposing the composite particles includes subjecting the composite particles to the shearing force to separate the composite particles and leave separated elements of carrier particles and flakes of individual maximum size equal to the carrier particle size.

3. A method of separating composite particles as defined by claim 1 wherein the step of producing the velocity gradient includes producing a shearing force in the liquid and wherein the step of exposing the composite particles includes subjecting the composite particles to the shearing force to separate the composite particles and leave separated elements in which the maximum carrier particle size is equal to the composite particle size.

4. A method of separating composite particles of magnetite particles and flakes absorbed on the magnetite particles within a liquid suspension, comprising the steps of:

introducing the liquid and composite particle suspension into an intake of a centrifugal pump having a rotatable vane within a housing and a tangential discharge;

rotating the vane to create a velocity gradient and a resulting shearing force within the tangential discharge; and exposing the composite particles to the shearing force produced by the velocity gradient to separate the composite particles within the suspension into individual magnetite particles and flakes.

5. A method of separating composite particles as defined by claim 4 including rotating the vane to produce a shearing force against the composite particles to separate the composite particles and leave separated magnetite particles and flakes of individual maximum size equal to the magnetite particle size.

6. A method of separating composite particles as defined by claim 4 including rotating the vane to produce a shearing force against the composite particles to leave a solution including separated magnetite particles and flakes and in which the maximum remaining composite particle size is equal to the magnetite particle size.

7. A method of separating magnetite particles from flakes of calcium carbonate and calcium phosphate adhered thereto to form composite particles, suspended in water as a suspension, comprising the steps of:

introducing the suspension into an intake of a centrifugal pump having a rotatable vane within a housing and a single tangential discharge leading outward of the housing;

rotating the vane to create a turbulence within the housing;

producing a velocity gradient within the tangential discharge; and exposing the composite particles to the velocity gradient within the single tangential discharge to separate the magnetite particles from the flakes of calcium carbonate and calcium phosphate such that a resulting suspension then contains individual separated magnetite particles, calcium carbonate flakes, and calcium phosphate flakes, and in which remaining composite particles are of a maximum size equal to the size of the magnetite particles.

* * * * *